A. D. Tingley,
Horse Power.
№ 68,806. Patented Sep. 10, 1867.
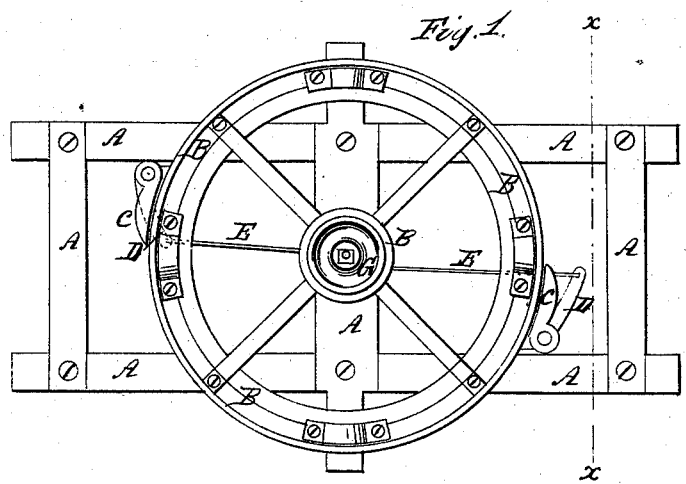
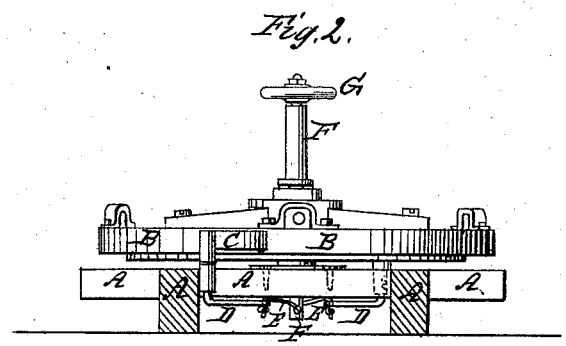
Witnesses
Theo Fusche
J. A. Service
Inventor
A D Tingley
Per Munn &
Attorneys

United States Patent Office.

A. D. TINGLEY, OF ADRIAN, MICHIGAN.

Letters Patent No. 68,806, dated September 10, 1867.

---

IMPROVEMENT IN BRAKES FOR HORSE-POWER.

---

The Schedule referred to in these Letters Patent and making part of the same.

---

TO ALL WHOM IT MAY CONCERN:

Be it known that I, A. D. TINGLEY, of Adrian, in the county of Lenawee, and State of Michigan, have invented a new and improved Brake for Horse-Powers; and I do hereby declare that the following is a full, clear, and exact description thereof, which will enable others skilled in the art to make and use the same, reference being had to the accompanying drawings, forming part of this specification, in which—

Figure 1 is a top view of a drive-wheel, showing my improved brake attached.

Figure 2 is a vertical section of the same taken through the line $x\ x$, fig. 1.

Similar letters of reference indicate like parts.

My invention has for its object to furnish an improved brake for attachment to horse-powers, which shall be simple in construction, effective in operation, easily and readily applied, and wholly out of the way; and it consists in the combination of one or more brake-shoes, arms, or levers, connecting ropes or chains, and operating shaft with each other, as hereinafter more fully described.

A is the frame of the machine, and B is the drive-wheel, to which the draught bars are attached in the ordinary manner. C are the brake-shoes, one or more of which are pivoted to the frame A of the machine, or to suitable supports, at whatever part of the wheel B may be most convenient, in such position or positions that they may be moved forward against the rim of said wheel. To these shoes C, or to the arms by which they are pivoted to their supports, are attached or upon them are formed arms or levers D, as shown in figs. 1 and 2. E are ropes or chains, one end of which is attached to the end of the arms or levers D, and their other ends are connected to the lower end of the shaft F, so that by turning the said shaft the shoes C will be drawn forward against the rim of the wheel B with any desired force. The shaft F passes down through the centre of the drive-wheel B, as shown in figs. 1 and 2, and to its upper end is attached a hand-wheel, G, for convenience in operating the said shaft F to apply the brakes. The hand-wheel G may, if desired, be so formed as to serve as a seat for the driver.

What I claim as new, and desire to secure by Letters Patent, is—

1. Operating the brakes by a shaft passing down through the centre of the drive-wheel, substantially as herein shown and described.

2. The combination of one or more shoes C, arms or levers D, ropes or chains E, and shaft F, with each other, and with the drive-wheel B, substantially as herein shown and described, and for the purpose set forth.

A. D. TINGLEY.

Witnesses:
J. W. MEDICK,
H. N. WILCOX.